United States Patent [19]
Strebel et al.

[11] Patent Number: 4,530,084
[45] Date of Patent: Jul. 16, 1985

[54] COMMUNICATIONS NETWORK WITH OPTICAL CHANNELS

[75] Inventors: Bernhard Strebel; Ernst-Jürgen Bachus, both of Berlin, Fed. Rep. of Germany

[73] Assignee: Heinrich Hertz Institut fuer Nachrichten technik, Berlin, Fed. Rep. of Germany

[21] Appl. No.: 424,929

[22] Filed: Sep. 27, 1982

[30] Foreign Application Priority Data

Oct. 8, 1981 [DE] Fed. Rep. of Germany ....... 3140178

[51] Int. Cl.³ .............................................. H04B 9/00
[52] U.S. Cl. ........................................ 370/3; 370/57; 455/607
[58] Field of Search ......................... 370/1, 3, 57, 124; 455/606, 607, 33, 34, 53, 73, 77, 612

[56] References Cited

U.S. PATENT DOCUMENTS

| | | | |
|---|---|---|---|
| 2,064,906 | 12/1936 | Green et al. | 370/57 |
| 2,327,711 | 8/1943 | Holden | 370/57 |
| 3,864,521 | 2/1975 | De Long et al. | 179/2.5 R |
| 3,912,876 | 10/1975 | Muller | 370/1 |
| 3,986,020 | 10/1976 | Kogelnik | 370/3 |
| 4,031,327 | 6/1977 | Butin et al. | 370/57 |
| 4,232,385 | 11/1980 | Hara et al. | 370/3 |
| 4,326,298 | 4/1982 | Fromm et al. | 455/607 |

FOREIGN PATENT DOCUMENTS 56-112142 9/1981 Japan .................................... 370/3

OTHER PUBLICATIONS

Baugs-The Anatomy of a Fiber Optic Link-Control Engineering-Aug. 1979, pp. 46-49.
Dupieux, J. G. et al.-"The Application of Fiber Optics'-'-155'81 CIC, Montreal 21-25, Sep. 1981.
Favre-"Progress Towards Heterodyne"-IEEE Jour. of Quantum Electronics, vol. QE-17, No. 6, Jun. 1981, pp. 897-905.
Robleux-Dispositif de Telephonic Optique-G-P-A-O-031557, 07-08-81.

Primary Examiner—Joseph A. Orsino, Jr.
Attorney, Agent, or Firm—Ralf H. Siegemund

[57] ABSTRACT

A communications network with optical channels is provided. Using the heterodyne principle, optical channels for narrow and wideband services can be provided in very large numbers to the subscriber stations connected to the communications network using a monomode fiber as the transmission medium. The switching of these channels can also be effected using the heterodyne principle with optional access without a connecting path network in the conventional sense, all the receiver equipments being connected with all the transmitter equipments via a common light frequency channel multiplex. The tuning to a channel from which reception is required is carried out using a tunable local laser. The intermediate frequency occurs in the microwave range. The intermediate frequency filter is fixed tuned.

9 Claims, 6 Drawing Figures

COMMUNICATIONS NETWORK WITH OPTICAL CHANNELS

BACKGROUND OF THE INVENTION

This invention relates to a communications network with optical channels which are provided in large numbers following the heterodyne principle.

In such a communications network, the transmission medium, an optical fiber, is operated in a light carrier frequency multiplex technique. A single common optical fiber thus offers the subscribers connected to it a very large number of channels, on which they can have access which is optional in the case of distribution services, for example radio programs, or by using a switching control system in the case of exchange services, for example telephone, video telephone and data communication.

The invention thus differs from previously known systems of optical communications technology in a manner which can be illustrated by comparison with the development of radio technology. Initially, the so-called direct reception was achieved here and there. In this case, transmission and reception are carried out on a particular wavelength or, in some cases, on some few particular wavelengths. The use of the superposition principle, which makes possible a substantially increased threshold sensitivity and selectivity compared with such arrangements, does, however, make it possible to utilize the transmission capacity of the medium completely. The advantages which this principle brought to radio technology are of outstanding importance but their importance has been generally forgotten in the meantime. The "Superhet" receiver helped radio technology to its first real breakthrough and is now standard in that field.

The heterodyne principle is therefore also of great interest to optical communications systems. Several publications, for example in "Electronics Letters" volume 16 (1980) pages 179 to 181, pages 709/710 and pages 826/827, refer to special details of the system components required, particularly the thermal stabilization of semiconductor lasers and corresponding control circuits. In the IEEE Journal of Quantum Electronics, volume QE-17 number 6, June 1981, pages 919 to 935, there is a comprehensive survey in which the properties and problems of the systems and system components of a coherent optical fiber transmission system are discussed in great detail. In the Conference Proceedings pages 7.1-1 to 7.1-3 of the 7th European Conference on Optical Communication, Copenhagen, Sept. 8-11th 1981, a point to point connection for a future optical heterodyne system with monomode fibers as transmission medium is shown as a block circuit diagram and described together with its components, particularly those involved in transmission and reception.

The main objective apparent from these publications is to achieve a distance between repeaters or a transmission length of approximately 100 km to 200 km, so that submarine connections can be realized in this manner. In this connection, it is assumed that there will be one fixed frequency channel for each pair of communications source and sink.

SUMMARY OF THE INVENTION

It is an object of the present invention to provide a communications network which has optical channels to which a large number of subscribers are connected, to whom narrow and in particular wideband channels are to be made available. As a part of this object, these channels should not only find more use only in purely distribution services, for example television programs, but also or mainly in individual services, for example data communication, telephone, television conferences, video phones and the like. This means that a large number of wideband channels has not only to be transmitted but arrangements have to be made for exchanging them. To this end, the main concern is less with large transmission lengths and much more in the direction of flexible allocation of channels and making it possible to have optional access to the channels.

To attain this object the present invention provides a communications network with optical channels provided in large numbers according to the heterodyne principle, comprising a laser reference unit with a distributor for the supply of transmitter equipments and receiver equipments, which equipments are associated and connected with communications sources and communications sinks, with a light carrier reference; tunable transmitter lasers in the transmitter equipments, by means of which one carrier frequency each is provided for signals supplied by associated communications sources; tunable local lasers in the receiver equipments, by means of which one fixed intermediate frequency to be rectified is formed in each case for the signals intended for the associated communications sinks; a common light frequency channel multiplex, via which the transmitter equipments and the receiver equipments are connected, and monomode fibers used as transmission medium.

It is of great importance to the invention and its embodiments that the ultra wide medium glass fiber should have tasks allocated to it in optical communications technology which the ether has for long fulfilled for radio technology—to be a communications node for many communication subscribers. Because of approximately 250,000 possible wideband channels calculated for one fiber, a novel conception for the future communications networks appears—the distribution and exchange of services without switching points via light frequency channels with heterodyne multiple access for all subscribers. Because of the large overall band width, it is also possible in this case to dimension each optical channel so generously that there is no need to subdivide into narrow and wideband channels. Similar considerations apply with respect to data reduction systems and multiple utilization in time multiplex techniques or similar. On the other hand, with a large number of channels of this nature being available, many services can be provided with small time lag (for example a film of normal duration on approximately 100 channels and one minute time delay in each case) and this would again notably reduce the apparently utopian high number of channels on offer with respect to the service and program contents of these channels.

The invention makes use of the heterodyne principle with respect to both transmission and switching. Outstandingly and surprisingly important in this respect is the fact that no connection path network in the usual sense is required for switching. The switching of a connection path between a source and a sink can be carried out in a decentralized fashion in the transmitter and receiver devices, in that all the carriers transmitted arrive at all the connected receiver devices by way of the common light frequency channel multiplex in the manner of a completely passive node and tuning to the appropriate carrier is carried out at the receiver device.

As with every switching arrangement, it is also possible in this case to differentiate between a controlling part and a controlled part. The parts to be controlled can be in the transmitter and receiver devices in embodiments of the invention. The controlling parts, on the other hand, can be provided at a common central location so that not only purely distribution services, for example television programs, but also individual services, for example video telephone, can be offered.

As also in radio technology, the advantages of the superheterodyne principle are fully realized by the invention for optical communications technology. By means of the conversion of the received signal by means of a local oscillator into an intermediate frequency range, the selectivity and sensitivity can be substantially improved compared with direct reception because filters with very high quality with respect to input frequency are substantially easier to achieve in the intermediate frequency range. Because in the case of optical channels, the received lightwave signal is superimposed by the lightwave of a local laser and an intermediate frequency in the microwave range is produced by the mixture of these two at the receiver, separation of the channels does not have to be carried out in the optical range, in which the minimum distance between channels is of the order of 10 THz because of the filter quality achievable in that range. In the microwave range, on the other hand, with filters of substantial better quality, the possible number of carriers or channels is increased by some orders of magnitude within the frequency band available and the sensitivity is simultaneously increased—compared with "direct reception".

However, in order to be able to use fixed filters with the optional access to the channels important to the invention, it must be possible to tune the appropriate frequency in the transmitter and receiver equipments, i.e. the transmitter laser and the local laser in the case of the invention. Such lasers are under development and will soon be available in sufficient quantity and quality concerning the rapid technological advance of the industry in this field.

As is known, an unmodulated wave must be introduced to form an intermediate frequency and this is produced by the receivers themselves in radio technology. In principle, this can also occur in the implementations of the invention but is modified, however, because of the circumstances more precisely described below. A light carrier frequency reference suitable for this purpose is made available, from which the various frequencies, and of course also with differing distances between carrier frequencies, can be derived for the transmitter and receiver equipments. The reasons for this are particularly in the requirements for stability in the frequencies to be produced and the bandwidth requirement specific to the services.

The fact that no connection path network in the usual sense is required for the switching of a channel and that a completely passive common light frequency channel multiplex is provided for connecting the transmitter and receiver equipments can, once again, be illustrated by comparison with conventional radio technology. In the latter case, the ether forms the passive frequency multiplex for the radio waves which are not associated with lines; in the present case, there is a corresponding fixed lightwave conducting medium into which all the transmitted frequencies are coupled and from which all the frequencies to be received can be extracted with optional access.

In preferred embodiments of the invention, the laser reference unit can produce a fixed light carrier reference lattice. Simple synchronization with the allocated frequency can then occur in the transmitter and receiver equipments to be provided with the light carrier reference.

Although access to the channels can be achieved in a purely decentralized fashion, i.e. each transmitter itself seeks a free channel and the appropriate receiver or receivers monitor the total number of channels on offer independently for the communications intended for them, comparable arrangement of modern communications networks of such a type make central monitoring and/or testing unavoidable. It is not only for these reasons that it is advantageous in embodiments of the invention to provide a central computer for the allocation and administration of channels. The tasks to be fulfilled by this unit are not limited only to signalling during the establishment and termination of a connection. In the case of pure distribution services, in which for each program a multiple of receivers are tuned to one single transmitter, the channels concerned can be fixed once and for all. In the case of individual services, particularly also for conference connections flexible channel allocation and administration is, on the other hand, to be recommended and this, for example, should be housed locally in a common exchange for a communications network at a local place.

Provided no long transmission distances arise within the switching range, which is the case in the basic form of the invention, there is no need even to consider the limits of the preferred low attenuation transmission band width of a monomode fiber, i.e. at least the ultra and infra threshold ranges are also usable. Even without this, there is a capacity of several tens of thousands of channels in a preferred embodiment of the invention using wideband channels with a mutual distance between light carriers in the GHz range, for example, 2 GHz corresponding approximately to 0.007 nm at $\lambda = 1$ $\mu$m.

The distributor, via which the receiver and transmitter equipments are supplied with light carrier reference, can be arranged as a simple optical star coupler. Although such star couplers have unavoidable losses, this can be compensated by the high sensitivity available with the heterodyne principle and light carrier reference supply is possible with simple means of this type.

Corresponding conditions apply to the common light frequency channel multiplex, which, in an advantageous embodiment of the invention, is also formed as an optical star coupler for the connection of the transmitter equipments and the receiver equipments. Connection can of course be brought about by any monomode conducting medium and thus, if required, with a spatially widely distributed and branched fiber network. Such fiber networks are for this purpose to a large extent independent of structure. Limitations exist, for example, to the extent that undesired reflections are to be avoided.

For reasons of operational security but also in order to carry out the administrative tasks in switching the channels, it is recommended that the central computer be allocated its own receiver equipment in embodiments of the invention. This, like all the other receiver equipments, is to be connected to the common light frequency channel multiplex so that it can be used to monitor all the traffic taking place in the network, i.e. each channel can be sampled.

The individual system components, such as control circuits, tunable lasers, synthesizing circuits, etc., i.e. both purely electronic and also optoelectronic components should be built using the integrated technique. By this means, modular units in particular can be formed for the transmitter and receiver equipments using appropriate design conceptions.

BRIEF DESCRIPTION OF THE DRAWINGS

Some preferred embodiments of the invention will now be described by way of example and with reference to the accompanying schematic drawings in which.

DESCRIPTION OF THE PREFERRED EMBODIMENTS

Figure 1:
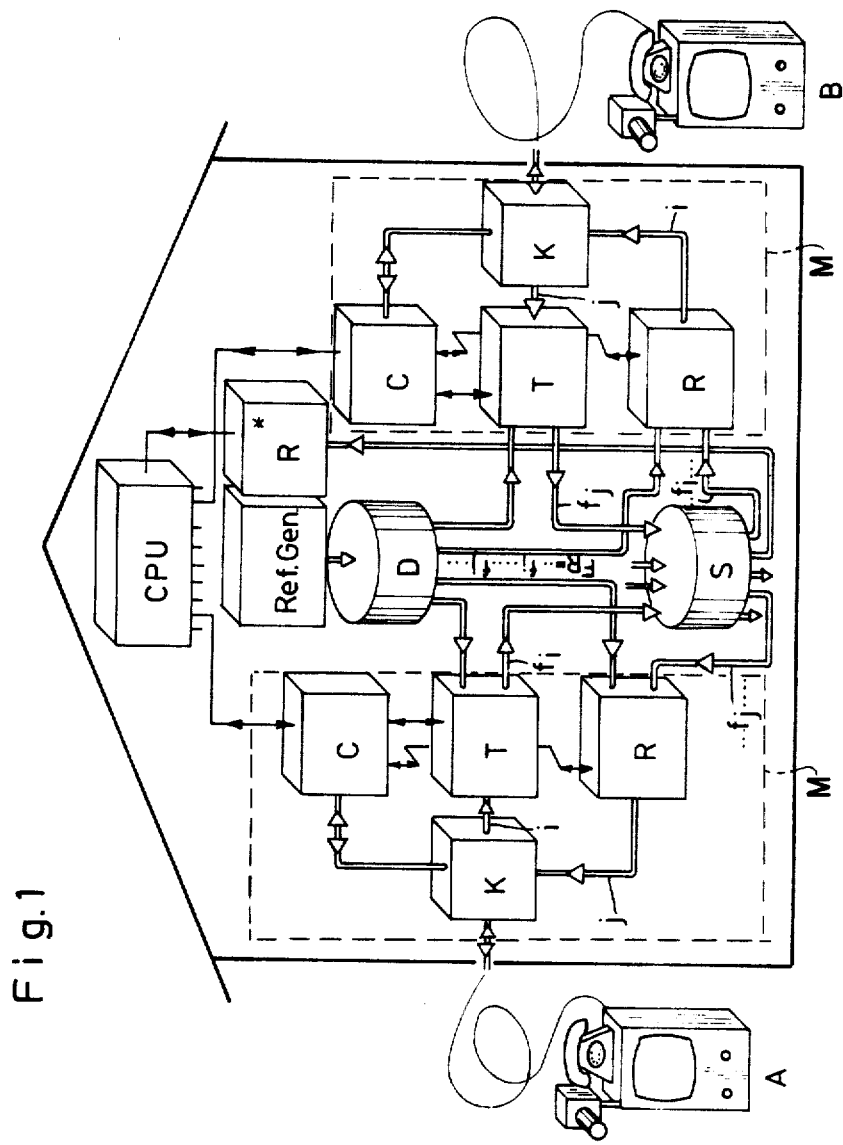
FIG. 1 is a block diagram of an optical channels exchange.

In the communications network according to FIG. 1, subscriber stations A, B . . . are connected, for example via monomode fibers, to an exchange or central station. The subscriber stations are equipped with varying types of end equipment, in particular equipment for wideband services such as television programs and video telephones. An optical directional coupler K is provided in the exchange or central station, via which the optical signals, intended for end equipment or delivered from it are guided from or to an appropriate receiver R, transmitter equipment T and control device C. One control device C can be responsible for several receiver equipments R and transmitter equipments T of a subscriber station such a A, or B . . .

A laser reference unit, indicated by Ref. Gen., generates the light carrier references, which are supplied to the reception equipments R and transmitter equipments T of all stations via an optical distributor D. The transmitter equipments T feed modulated carrier frequencies into the light frequency channel multiplex S. Each input signal appears at all outputs, which lead to receiver equipments R, R*. The connections indicated by double lines are optical connection paths (monomode fibers) and the connections represented by single lines can also be electrical signal conductors. The arrows show the direction in which the signal is transported. To make the diagram easier to understand, the equipment associated with each subscriber station is only represented for two subscribers A and B.

In order to explain FIG. 1 more precisely, a video telephone connection between the transmitting subscriber A and the receiving subscriber B is described below. The subscriber A inputs a service sign and dials subscriber B at his terminal, for example as a series of figures. This signal arrives at the associated control device C via the appropriate optical directional coupler K and from there passes with the senders address to a central computer CPU in the exchange. The central computer CPU checks whether the subscriber B, who has been called, is free or engaged. If Subscriber B is free, it is called and answers. The central computer CPU allocates a free pair of channels (frequencies) fi, fj and passes this information on to the two appropriate control devices C of stations A and B. The control devices C call their respective transmitter equipments T and reception equipments R to tune to channels i and j. The frequencies fi and fj are the light carrier reference arranged frequencies $f_R$. The connection is thus effected. The communication exchange—picture and tone—from subscriber A to subscriber B takes place on the carrier frequency fi and on the carrier frequency fj in the opposite direction. The connection is terminated, for example, by the hand equipment of one of the subscribers A or B being hung up.

The reception device R*—and a transmitter device T*, which is not shown here—have the particular function of monitoring the correct occupation of the channels.

Embodiments of the invention of this type are universally applicable, i.e. they are suitable both for small plants, extension systems, inhouse communications network and for rapid computer connection systems, bus systems and the like.

Figure 2:
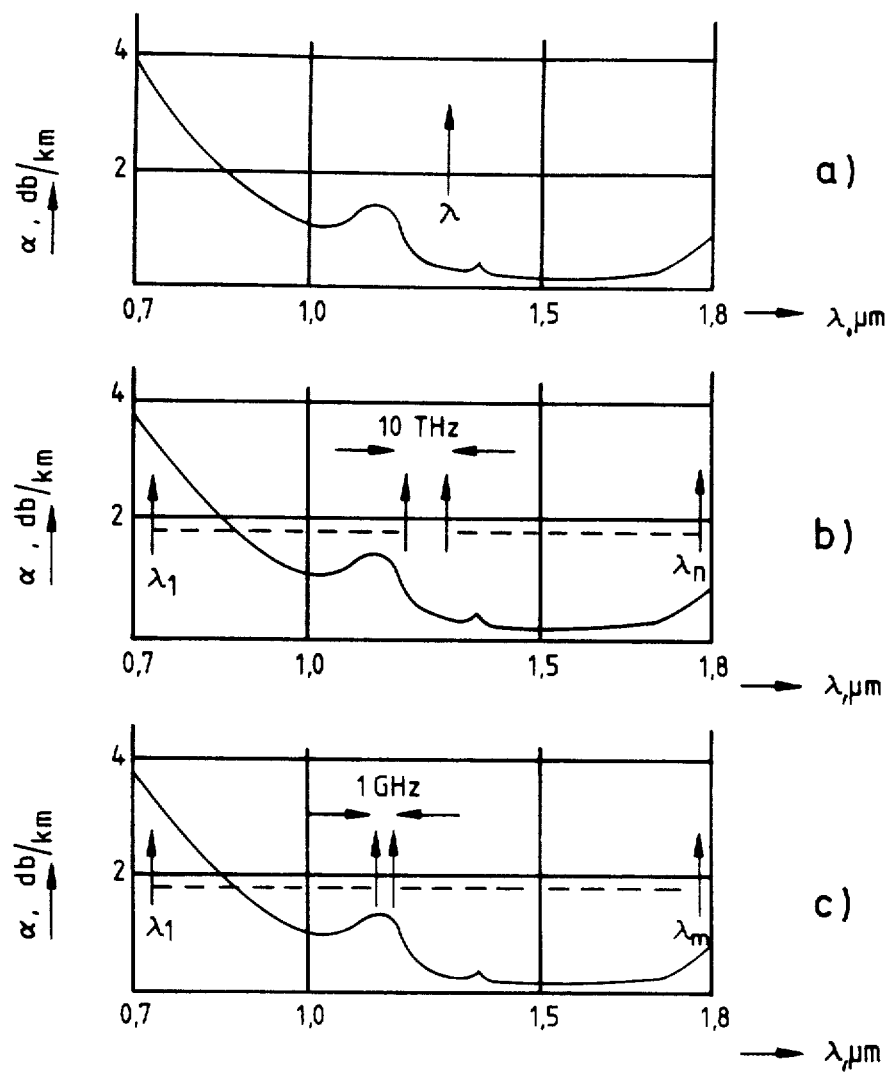
FIG. 2 shows diagrams of channel occupancy of a single mode fiber, i.e.:
 (a) for optical single channel transmission,
 (b) for λ multiplex (approximately 40 channels),
 (c) for light frequency multiplex (approximately 250,000 channels)

FIG. 2 illustrates the advances of optical communication technology with reference to the utilization of the transmission capacity of an optical fiber.

Initially, only one light carrier has been transmitted via one fiber (FIG. 2a).

After this efforts were made to prove utilization of the fiber by the λ multiplex technique, in which several light carriers of different wave lengths transmit simultaneously through the fiber (FIG. 2b) and are separated at the outlet of the fiber by optical filters. At the current state of filter and laser technology, the light carriers $\lambda_1$, . . . $\lambda_n$ should be located at least some ten nanometers from one another in order to make possible reliable separation. If a difference between wavelengths of, for example, 30 nm (corresponding approximately to 10 THz) is chosen, a modern monomode fiber can accommodate approximately 40 light carriers in the low attenuation wavelength range of 0.7 to 1.8 μm. The λ multiplex technique corresponds to direct reception in radio technology—in this case also, the received signals are separated by high frequency filters.

In the case of the optical heterodyne reception (FIG. 2c), the channels are no longer separated in the optical range—as in the case of the λ multiplex technique—but use an intermediate frequency, which, for example will lie in the microwave range. In the microwave range, filters with substantial quality can be achieved, compared with that obtainable at light frequency. If a distance between light carriers of, for example, 1 GHz is chosen, approximately 250,000 light carriers can be transmitted along one fiber and separated again at the receiver position using the heterodyne principle.

Figure 3:
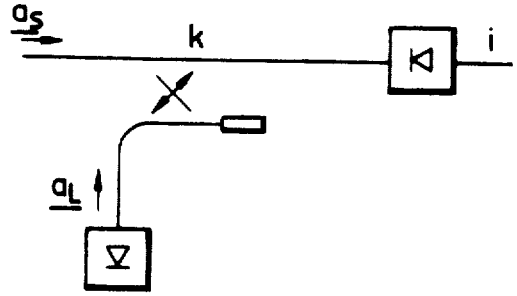
FIG. 3 is a representation in principle of optical heterodyne reception.

FIG. 3 shows the principle of an optical superheterodyne receiver. The light signal complex wave amplitude $a_s$ and the local laser complex wave amplitude $a_L$ pass via a fiber directional coupler (decoupling factor k) to an optical detector with an output current proportional to the light power (for example PIN-diodes). It transforms the signal into an intermediate frequency range.

The conversion to the intermediate frequency range occurs proportionally to the product of the wave amplitudes, provided $a_s$ and $a_L$ have identical field modes and polarization, i.e. are spatially coherent. It is also necessary to stabilize the laser frequency in order to achieve a constant intermediate frequency.

Figure 4:
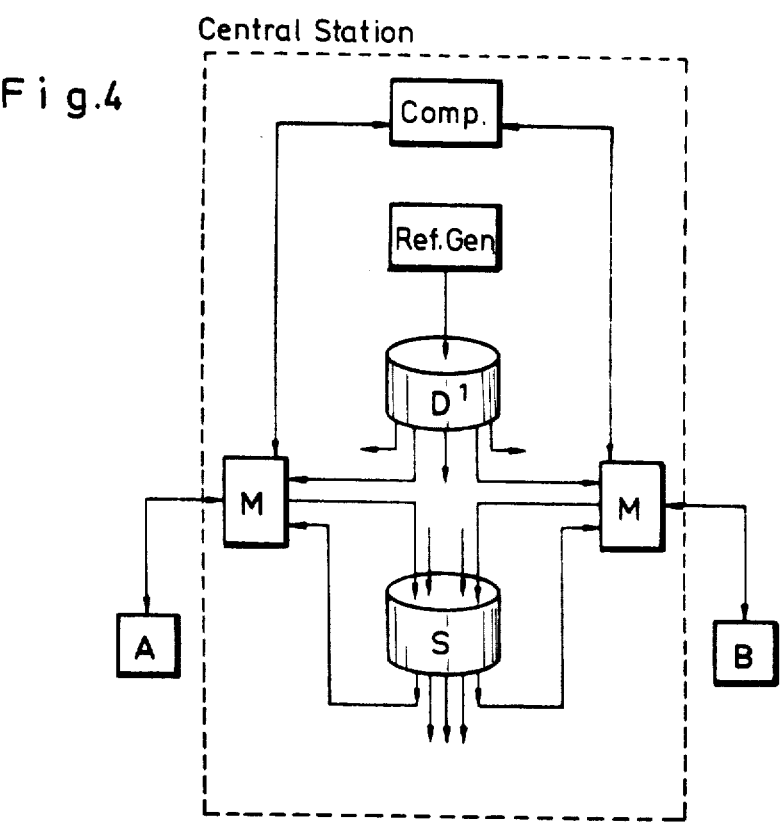
FIG. 4 shows a block diagram, similar to FIG. 1, for an exchange network with star structure.

FIG. 4 shows an embodiment of the invention in which the heterodyne principle is employed exclusively for central exchange without switching points in a star network. The transmission to the subscriber connecting lines can occur in a conventional manner in this case.

In the central station, a transmitter and receiver module M allocated to each subscriber A, B . . . , by means of which he obtains access to an optical frequency multiplex (optical star coupler S). The inner side of each of the subscribers own modules M has a tunable transmitter laser with modulator and a similarly tunable receiver local laser. All the modules M transmit to the input side of the star coupler S and are connected at its outlet with the complete communication current but by means of heterodyne reception, they select only the channel intended for themselves. In order to subdivide the frequency ranges into the various channels, a carrier frequency lattice is sent out by a reference generator Ref. Gen. via a star coupler $D^1$ and the subscriber modules M synchronize to the carrier frequency lattice. The computer comp. has the task of selecting the free light channels for the connections, causing the subscribers to set their stations to these channels and of monitoring the channel occupancy. A video conference between several subscribers can conveniently be established by the computer by appropriate tuning instructions to the heterodyne receivers.

Figure 5:
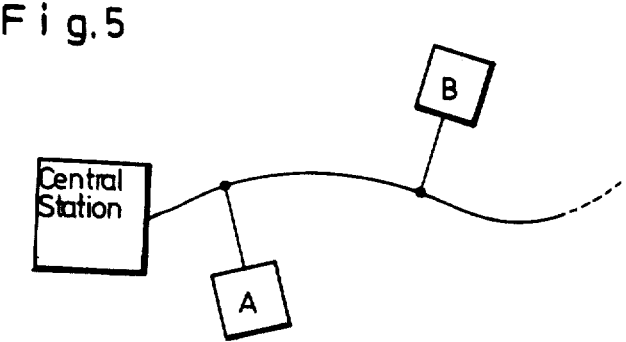
FIG. 5 is a representation in principle of an exchange network with line structure.

In a line network in accordance with FIG. 5, all the subscribers A, B, . . . are connected with one another via a single fiber. One light frequency is allocated to each transmitter laser of each subscriber as required, all transmitter frequencies are referred to the frequency of the reference laser, which is located in the central station. Each subscriber station monitors the communications of all the other subscriber stations and selects only those intended for itself. The connection between subscribers A and B can also be established by a computer in the central station, which then gives the corresponding tuning instruction to the heterodyne receiver of the subscriber.

A fiber saving line network with time multiplex technique and optical transmission technique using direct reception fails as soon as many subscribers exchange wideband communications. The summed information of all the subscribers produces a correspondingly high transmission speed in the fiber and correspondingly high rate electronics at each subscriber. These problems can be overcome if the optical frequency multiplex technique in accordance with the invention is used instead of the baseband time multiplex technique. Such a line network, which can completely utilize the band width of the fiber by a coherent optical transmission technique, makes it possible for a large number of subscribers to exchange wideband information; an extension of the network by additional subscribers requires only a correspondingly higher tuning range for the individual heterodyne receivers.

Figure 6:
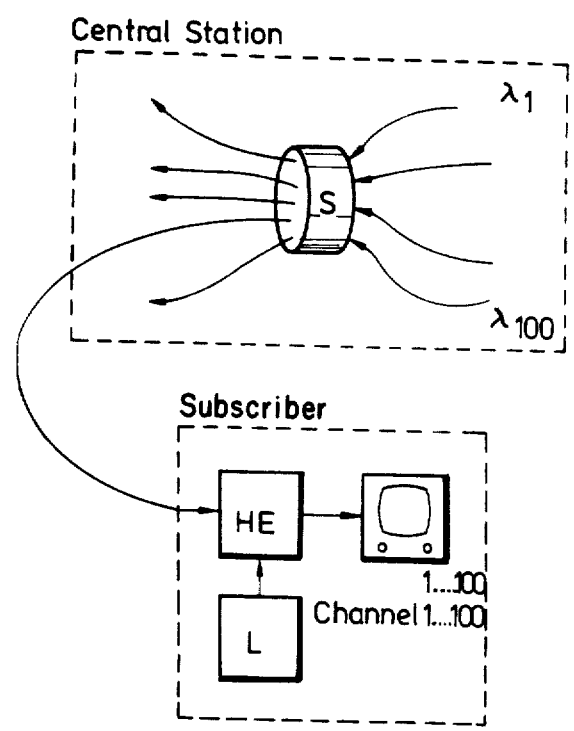
FIG. 6 shows a block diagram for a distribution network with star structure.

For the distribution of, for example, 100 television signals, a light carrier $\lambda_1$ . . . $\lambda_{100}$ is allocated to each television channel in the central station in accordance with FIG. 6. All the light carriers are fed into the subscriber connection lines via a star coupler S. Each subscriber has an optical heterodyne receiver HE and the choice of the various television programs takes place by means of a constant intermediate frequency using a tunable local laser.

The attenuation of the signal level in the subscribers connection lines due to the power distribution in the star coupler is partially compensated by the increased sensitivity of the heterodyne receivers. If optical amplifiers are available as standard components, for example using the integrated optic manufactured on a chip, these can, for example, be placed between the star coupler S and the connection lines of the subscribers.

The invention may be embodied in other specific forms without departing from the spirit or essential characteristics thereof. The embodiments are therefore to be considered in all respects as illustrative and not restrictive.

What is claimed is:

1. A communication system comprising:
    a laser reference generator generating a plurality of carrier reference frequency signals in a band of light wave frequencies including frequencies f1, f2, . . . fn,
    a plurality of stations each comprising an optical receiver having heterodyne means including a local tunable laser and an optical-electrical detector, further an electrical band pass filter connected to the detector each filter being tuned to the same predetermined, fixed selected intermediate frequency in the microwave range common to all stations; a transmitter including a tunable laser and modulating means; a control means for controlling said transmitter tunable laser and said receiver tunable laser as to the respective laser frequency; a coupler; and end equipment coupled by said coupler to said transmitter, to said receiver and to said control means;
    means including a monomode optical fiber signal path connected to distribute the carrier reference signals to each transmitter and each receiver in the several stations;
    means for allocating particular frequency values from among the plurality of reference frequencies for causing said control means to synchronize and to stabilize light frequencies as generated by the tunable lasers in the transmitter and receiver of each station, depending upon the allocated reference frequency values;
    the control means of a selected station controlling its associated transmitter to synchronize the transmitter tunable laser so as to generate an allocated carrier frequency signal f1 distributed to it by said optical fiber signal path means, and the selected station and equipment being coupled by its coupler to its transmitter to modulate the carrier signal f1 as generated by the transmitter tunable laser to produce a modulated carrier signal being transmitted by the transmitter of the selected station;
    a common multiplex means including a second monomode optical fiber signal path means and coupled to receive the transmitted modulated signal from the selected station transmitter and distribute the modulated signal by the second optical fiber signal path means to the receivers of the stations of the plurality; and the control means of a second selected station controlling its associated receiver to tune the local receiver tunable laser to heterodyne with the received modulated signal of carrier frequency $f^1$ to provide the fixed intermediate frequency signal, said intermediate frequency signal being passed through the second selected station receiver band pass filter and applied by the second selected station coupler to the second selected station end equipment.

2. A communication system as claimed in claim 1 wherein the laser reference generator carrier frequencies are fixed frequencies $f_1, f_2, \ldots f_n$.

3. A communications system as claimed in claim 1 wherein the respective carrier frequencies are separated each from its closest ajacent carrier frequency by not less than about a GHz.

4. A communications system as claimed in claim 1 wherein the means for distributing the carrier reference frequencies comprises an optical star coupler.

5. A communications system as claimed in claim 1 wherein said multiplex coupling means comprises an optical star coupler.

6. A communications system as claimed in claim 1 wherein the light frequency channel multiples includes a spatially widely distributed, branched fiber network.

7. A communications system as claimed in claim 1 wherein the receiver, transmitter, control means, and coupler of each of said stations is in the form of an integrated circuit.

8. A communications system as claimed in claim 1 further comprising a central computer connected with said stations to control the control means for the control of the selected station lasers.

9. A communications system as claimed in claim 8 wherein a receiver is connected with said computer, said receiver receiving all the signals received by the other receivers.

* * * * *